(12) United States Patent
Fabian

(10) Patent No.: US 6,553,169 B2
(45) Date of Patent: Apr. 22, 2003

(54) OPTICAL FIBER COATING COMPOSITIONS AND COATED OPTICAL FIBERS

(75) Inventor: Michelle D. Fabian, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 108 days.

(21) Appl. No.: 09/726,002

(22) Filed: Nov. 29, 2000

(65) Prior Publication Data
US 2003/0053781 A1 Mar. 20, 2003

(51) Int. Cl.$^7$ ................................................ G02B 6/02
(52) U.S. Cl. ...................... 385/128; 65/385; 427/163.2
(58) Field of Search .................. 385/122–126, 385/141, 147, 128; 65/385, 435; 428/378; 427/163.2, 515; 522/180, 12, 83; 528/307, 376

(56) References Cited

U.S. PATENT DOCUMENTS

| | | | |
|---|---|---|---|
| 4,474,830 A | | 10/1984 | Taylor |
| 4,486,212 A | | 12/1984 | Berkey |
| 4,581,165 A | | 4/1986 | Frank et al. |
| 4,608,409 A | | 8/1986 | Coady et al. |
| 4,609,718 A | | 9/1986 | Bishop et al. |
| 4,629,287 A | | 12/1986 | Bishop |
| 4,690,502 A | | 9/1987 | Zimmerman et al. |
| 4,694,052 A | * | 9/1987 | Hirose et al. ............... 522/96 |
| 4,752,112 A | | 6/1988 | Mayr |
| 4,798,852 A | | 1/1989 | Zimmerman et al. |
| 4,921,880 A | * | 5/1990 | Lee et al. .................... 522/12 |
| 4,962,992 A | | 10/1990 | Chapin et al. |
| RE33,677 E | * | 8/1991 | Vazirani ..................... 385/123 |
| 5,104,433 A | | 4/1992 | Chapin et al. |
| 5,146,529 A | | 9/1992 | Mizutani |
| 5,181,269 A | * | 1/1993 | Petisce ....................... 385/126 |
| 5,188,864 A | * | 2/1993 | Lee et al. ................... 427/387 |
| 5,262,362 A | | 11/1993 | Covino-Hrbacek |
| 5,446,821 A | | 8/1995 | Nonaka et al. |
| 5,486,378 A | | 1/1996 | Oestreich et al. |
| 5,621,838 A | | 4/1997 | Nomura et al. |
| 5,643,665 A | | 7/1997 | Saidi |
| 5,664,041 A | * | 9/1997 | Szum ......................... 385/128 |
| 6,014,488 A | * | 1/2000 | Shustack .................... 385/128 |

FOREIGN PATENT DOCUMENTS

WO   WO 00/66636   11/2000

OTHER PUBLICATIONS

Handbook of Pressure Sensitive Adhesive Technology, 3$^{rd}$ Edition, Warwick, RI 1999 pp. 36,37,57–61, 169, 173, 174 and 609–631.

* cited by examiner

*Primary Examiner*—Akm E. Ullah
(74) *Attorney, Agent, or Firm*—James V. Suggs; Timothy R. Krogh (57) ABSTRACT

One aspect of the present invention relates to an optical fiber coating composition including a titanate or zirconate coupling agent. The composition has, when cured, a Young's modulus of greater than about 50 MPa. Another aspect of the present invention relates to a coated optical fiber including a glass fiber; and a coating located not less than about 5 microns away from an outer surface of the glass fiber, the coating being the polymerization product of a curable composition, the curable composition including a titanate or zirconate coupling agent. The coating compositions of the present invention may be used as secondary coatings and as marking inks for optical fibers. Use of titanate or zirconate coupling agents in secondary coating compositions can provide increased wet aging properties to the cured secondary coating. Use of titanate or zirconate coupling agents in ink compositions can provide increased pigment dispersion in the ink.

21 Claims, 2 Drawing Sheets

OPTICAL FIBER COATING COMPOSITIONS AND COATED OPTICAL FIBERS

BACKGROUND OF THE INVENTION

1. Field of the Invention

The present invention relates generally to optical fibers, and particularly to coatings applied to the optical fiber.

2. Technical Background

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers typically contain a glass core, a glass cladding, and at least two coatings, e.g., a primary (or inner) coating and a secondary (or outer) coating. The primary coating is applied directly to the glass fiber and, when cured forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use. The optical fibers may also include an ink as an outer most layer to assist in identifying different optical fibers included in a fiber optic ribbon or cable.

In the past, the ink layer has exhibited poor adherence to the outer coating layer. The ink layer at times may delaminate from the adjacent coating layer. There exists a need to improve the adherence between the ink layer and the outer most coating layer and still maintain the ink pigment evenly dispersed throughout the ink.

SUMMARY OF THE INVENTION

One aspect of the present invention is an optical fiber coating composition. The composition is a UV curable composition which includes a coupling agent devoid of any Si containing compound. The cured composition has a Young's modulus of at least about 50 MPa.

In another aspect, the present invention relates to an optical fiber coating. The coating is a UV curable coating which includes a coupling agent devoid of any Si containing compound. The coating is located not less than about 5 microns away from an outer surface of the glass fiber.

In a further aspect, the present invention relates to an optical fiber coating. The coating is a UV curable coating which comprises a coupling agent devoid of any Si containing compound. The cured coating has a percent change in tensile strength of no more than about 10% after the cured coating has been exposed to about 85% relative humidity at 85° C. for at least about 14 days. Preferably the coating has a percent change in Young's modulus of no more than about 10% after the cured coating has been exposed to about 85% relative humidity at 85° C. for at least about 14 days. It is also preferred that the coating has a percent change in Secant modulus of no more than about 15% after the cured coating has been exposed to about 85% relative humidity at 85° C. for at least about 14 days.

The use of the aforementioned coupling agent in an ink will result in the advantages of the ink having better adhesion to the secondary coating for at least the reason that the ink is reactive. Inks which include the inventive coupling agent have also exhibited the advantage of decreased settling rates than that of inks without the inventive coupling agent.

Optical fiber coatings that include the inventive coupling agent have exhibited the advantage of enhanced physical properties. Optical fiber coatings which included the inventive coupling agent have demonstrated the advantage of exhibiting less of a change in tensile strength, Young's Modulus, and Secant Modulus after the coating was exposed to a wet environment.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical fiber coating of the present invention is shown in FIG. 1, and is designated generally throughout by reference numeral 10.

Figure 1:
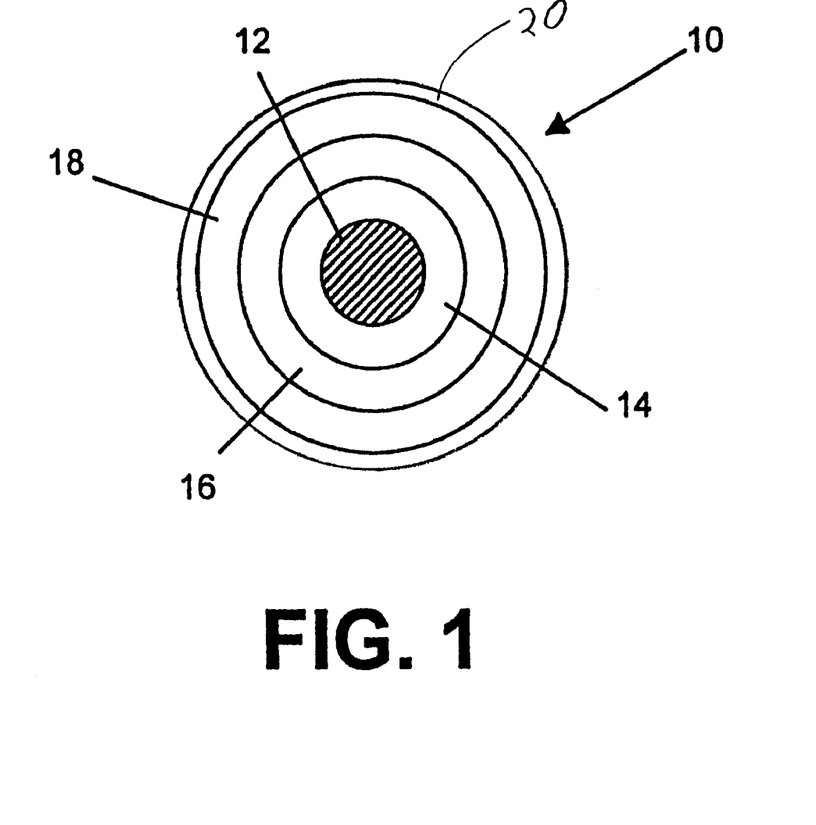
FIG. 1 is a cross sectional view of a coated optical fiber.

The present invention relates to an optical fiber coating composition as shown in FIG. 1. The inventive composition is a UV curable composition which comprises a coupling agent devoid of any Si containing compound. Preferably, the coupling agent is a coating additive that is used to couple, i.e., chemically attach or bond, two compounds having different chemical structures or a coating additive that can undergo co-polymerization and not addition polymerization. More preferably, with respect to an ink layer, the coupling agent is used to couple the pigment to the resin matrix (the oligomers and the monomers) of the inks due to the presence of functional groups that are capable of reacting with the acrylate groups on the oligomers and monomers. Additionally it is more preferably when the coupling agent is used as part of a secondary coating, i.e., a coating with no particulate fillers, the coupling is reacting to form part of the coating network due to the presence of functional groups that co-polymerize with the acrylate groups on the oligomers and monomers. It is more preferred that the coupling agent is not a monomer or an oligomer. The cured composition has a Young's modulus of at least about 50 MPa, preferably at least about 100 MPa, more preferably at least about 500 MPa, and most preferably at least about 1000 MPa.

Preferably, the coupling agent includes at least one compound selected from the group of compounds consisting of a titanate containing compound, a zirconate containing compound, and mixtures thereof. In case that the coupling agent consists of a titanate containing compound, the coupling agent consists of at least one ethyleneically unsaturated titanate containing compound, and more preferably at least one neoalkoxy titanate containing compound. Most preferably, the titanate containing compound consists of least one of the following group of compounds consisting of tetra (2,2 diallyoxymethyl)butyl, di(ditridecyl)phosphito titanate (commercially available as KR 55, from Kenrich Petrochemcials, Inc. (hereinafter Kenrich) Bayonne, N.J.), neopentyl(diallyl)oxy, trineodecanonyl titanate (commercially available as LICA 01 from Kenrich), neopentyl(diallyl)oxy, tri(dodecyl)benzene-sulfony titanate (commercially available as LICA 09 from Kenrich), neopentyl(diallyl)oxy, tri(dioctyl)phosphato titanate (commercially available as LICA 12 from Kenrich), neopentyl(dially)oxy, tri(dioctyl)pyro-phosphato titanate (commercially available as LICA38 from Kenrich), neopentyl(diallyl)oxy, tri(N-ethylenediamino)ethyl titanate (commercially available as LICA 44 from Kenrich), neopentyl(diallyl)oxy, tri(m-amino)phenyl titanate (commercially available as LICA 97 from Kenrich), neopentyl(diallyl)oxy, trihydroxy caproyl titanate (formerly available as LICA 99 from Kenrich), and mixtures thereof.

Preferably, the titanate containing compound contains at least one UV curable functional group. More preferably, the functional group is a (meth)acrylate or acrylate functional group.

In case that the coupling agent consists of a zirconate containing compound, preferably the coupling agent consists of at least one ethyleneically unsaturated zirconate containing compound, and more preferably at least one neoalkoxy zirconate containing compound. Most preferably, the titanate containing compound consists of least one of the following group of compounds consisting of tetra (2,2 diallyloxymethyl)butyl, di(ditridecyl)phosphito zirconate (commercially available as KZ 55 from Kenrich), neopentyl (diallyl)oxy, trineodecanoyl zirconate (commercially available as NZ 01 from Kenrich), neopentyl(diallyl)oxy, tri (dodecyl)benzene-sulfony zirconate (commercially available as NZ 09 from Kenrich), neopentyl(diallyl)oxy, tri(dioctyl)phosphato zirconate (commercially available as NZ 12 from Kenrich), neopentyl(diallyl)oxy, tri(dioctyl) pyro-phosphato zirconate (commercially available as NZ 38 from Kenrich), neopentyl(diallyl)oxy, tri(N-ethylenediamino)ethyl zirconate (commercially available as NZ 44 from Kenrich), neopentyl(diallyl)oxy, tri(m-amino) phenyl zirconate (commercially available as NZ 97 from Kenrich), neopentyl(diallyl)oxy, trimethacryl zirconate (commercially available as NZ 33 from Kenrich), neopentyl (diallyl)oxy, triacryl zirconate (formerly available as NZ 39 from Kenrich), dineopentyl(diallyl)oxy, diparamino benzoyl zirconate (commercially available as NZ 37 from Kenrich), dineopentyl(aiallyl)oxy, di(3-mercapto) propionic zirconate (commercially available as NZ 66A from Kenrich), and mixtures thereof Preferably, the zirconante containing compound contains at least one UV curable functional group. More preferably, the functional group is a (meth)acrylate or acrylate functional group.

The preferred concentration of the inventive coupling agent in the UV curable composition is at least more than about 0.05 weight percent and no more than about 0.3 weight percent, more preferably, the concentration is at least about 0.1 weight percent to about 0.2 weight percent.

The present invention relates to an optical fiber prepared with a primary coating composition of the present invention. Referring to FIG. 1, the optical fiber 10 includes a glass core 12, a cladding layer 14 surrounding and adjacent to the glass core 12, a primary coating material 16 which adheres to the cladding layer 14, at least one secondary (or outer) coating material 18 surrounding and adjacent to the primary coating material 16, and an ink 20 adheres to the secondary coating material 18.

Any conventional material can be used to form the glass core 12, such as those described in U.S. Pat. No. 4,486,212 to Berkey, the specification of which is hereby incorporated by reference. The core is typically a silica glass having a cylindrical cross section and a diameter ranging from about 5 to about 10 $\mu$m for single-mode fibers and about 20 to about 100 $\mu$m for multi-mode fibers. The core can optionally contain varying amounts of other material such as, e.g., oxides of titanium, thallium, germanium, fluorine, and boron, which modify the core's refractive index. Other dopants which are known in the art can also be added to the glass core to modify its properties.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention. In one preferred embodiment, the outer diameter of cladding layer 14 is about 125 $\mu$m for single-mode and multi-mode fibers.

A suitable primary coating 16 is a UV curable acrylate resin. In one embodiment of the invention, primary coating 16 has an outer diameter of about 190 $\mu$m. Preferably, the coating is not a thermoplastic resin. A thermoplastic resin is meant to mean at least a resin that is not chemically crosslinked and that has a melting point. In comparison, the UV curable coating is chemically crosslinked and the coating does not have a melting point, instead the coating has a glass transition temperature. The primary coating will typically include at least one oligomer that is capable of being polymerized, at least one monomer suitable to control viscosity, a photoinitiator, and various other additives such as an adhesion promoter. Primary coating 16 preferably has a Young's modulus of about 5 MPa or less.

A preferred component of the primary coating composition of the present invention is the oligomer. Preferably the oligomer is an ethylenically unsaturated oligomer, more preferably a (meth)acrylate oligomer. By (meth)acrylate, it is meant an acrylate or a methacrylate. The (meth)acrylate terminal groups in such oligomers may be provided by a monohydric poly(meth)acrylate capping component, or by a mono(meth)acrylate capping component such as 2-hydroxyethyl acrylate, in the known manner. It is also preferred that the oligomer is capable of participating in addition polymerization.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference, describe such syntheses of the oligomers in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Thus, it is desirable for the primary coating composition of the present invention to contain at least one ethylenically unsaturated oligomer, although more than one oligomer component can be introduced into the composition. Preferably, the oligomer(s) is present in an amount between about 10 to about 90 percent by weight, more preferably between about 35 to about 75 percent by weight, and most preferably between about 40 to about 65 percent by weight.

Suitable ethylenically unsaturated oligomers for primary coatings include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

Furthermore, the coating compositions of the invention will typically include at least one monomer component. Preferably, the monomer is an ethylenically unsaturated monomer, more preferably a (meth)acrylate monomer. Generally, suitable monomers are those for which the resulting homopolymer would have a glass transition temperature $(T_g)$ of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the monomer component will be selected on the basis of its compatibility with the selected moisture-resistance oligomer. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the primary coating composition to contain at least one ethylenically unsaturated monomer, although more than one monomer can be introduced into the composition. Preferably, the ethylenically unsaturated monomer is present in an amount between about 10 to about 90 percent by weight, more preferably between about 20 to about 60 percent by weight, and most preferably between about 25 to about 45 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Cognis f.k.a. Henkel (Ambler, Pa.)), ethoxylatednonylphenol acrylate (e.g., SR504 available from Sartomer Company, Inc. and Photomer 4003 available from Cognis), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Cognis), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FAI0 available from CPS Chemical Co.), 2-(2-ethoxyethoxy)ethyl acrylate (e.g., SR256 available from Sartomer Company, Inc.), and combinations thereof.

Optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 μm is, e.g., less than 1.0 J/cm$^2$, preferably less than 0.5 J/cm$^2$.

Suitable photoinitiators include 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl)diphenyl phosphine oxide (Lucerin TPO, available from BASF (Munich, Germany)), ethoxy (2,4,6-trimethylbenzoyl)phenyl phosphine oxide (Lucerin TPO-L from BASF), and combinations thereof.

The coating composition may also include an adhesion promoter. It is preferred that the adhesion promoter includes a compound containing a cyclic structure interposed between at least two reactive silanes which are independently an alkoxysilane or a halosilane.

The cyclic structure can be a hydrocarbon cyclic structure or a heterocyclic structure or a combination thereof. Hydrocarbon cyclic structures and heterocyclic structures can be single-ring, fused-ring, or multi-ring structures, with or without hydrocarbon or hetero-substituents. Suitable hydrocarbon cyclic structures include, but are not limited to, cycloalkanes, preferably containing between 3 to 10, more preferably 5 to 6 carbon atoms per cyclic structure; cycloalkenes, preferably containing between 3 to 10, more preferably 5 to 6 carbon atoms per cyclic structure; cycloalkyldienes, preferably containing between 3 to 10, more preferably 5 to 6 carbon atoms per cyclic structure; substituted aliphatic rings; aromatic rings; and substituted aromatic rings. Preferably the hydrocarbon cyclic structure is an aromatic ring or a substituted aromatic ring. Exemplary hydrocarbon cyclic structures include, but are not limited to, benzene, naphthalene, cyclohexane, cyclohexene, etc. Suitable heterocyclic structure include those which contain oxygen, nitrogen, sulfur, or phosphorous hetero atom(s) within the ring structure. Exemplary heterocyclic structures include, but are not limited to, pyridines, pyrroles, imidazoles, indoles, pyrimidines, pyrrolidines, piperidines, furans, thiophenes, etc.

The at least two reactive silanes can independently be an alkoxysilane, a dialkoxysilane, a trialkoxysilane or any other suitable polyalkoxysilane, a halosilane, a dihalosilane, or a trihalosilane. Preferably, the at least two reactive silanes are independently dialkoxysilanes, trialkoxysilanes, or trihalosilanes. Suitable alkoxysilanes, polyalkoxysilanes, dialkoxysilanes, and trialkoxysilanes include alkoxy groups independently having between 1 and 6 carbon atoms. A preferred halosilane is a chlorosilane, more preferably a trichlorosilane.

The compound can also include a substituent interposed between the cyclic structure and one (or more) of the at least two alkoxysilanes. Suitable substituents include straight-chain alkylene groups having between 1 and 12 carbon atoms; branched-chain alkylene groups having between 1 and 12 carbon atoms; straight and branched-chain alkylene groups having a heterogroup; and a heterogroup including, but not limited to, oxygen, nitrogen, sulfur, phosphorous, selenium, titanium, zirconium, and silicon.

Preferred compounds include bis(trimethoxysilylethyl) benzene and bis(triethoxysilylethyl)benzene. Bis (trimethoxysilylethyl)benzene is commercially available from Gelest (Tellytown, Pa.) and United Chemical Technologies, Inc. (Bristol, Pa.). Bis(triethoxysilylethyl) benzene can be synthesized from bis(trimethoxysilylethyl) benzene by trans-esterification with ethanol.

Preferably the adhesion promoter is present in an amount between about 0.1 to about 10 parts per hundred, more preferably between about 0.25 to about 4 parts per hundred, most preferably between about 0.5 to about 3 parts per hundred.

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

In addition to the above-described components, the primary coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical).

A preferred co-monomer is the polar monomer N-vinyl-pyrrolidone available from International Specialty Products (Wayne, N.J.).

Another aspect of the present invention relates to a composition that contains an oligomer capable of being polymerized, a monomer suitable to control the viscosity of the composition, an adhesion promoter that includes a compound containing a reactive silane, and a carrier.

The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 10 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Aclaim 3201 (poly(ethylene oxide-co-propylene oxide)) available from Bayer (formerly known as Lyondel), Newtown Square, Pa., and non-reactive surfactants Tegoglide 435 (polyalkoxypolysiloxane) available from Goldschmidt Chemical Co. The polyol or non-reactive surfactants may be present in a preferred amount between about 0.01 pph to about 10 pph. Suitable carriers may also be ambiphilic molecules. An ambiphilic molecule is a molecule that has both hydrophilic and hydrophobic segments. The hydrophobic segment may alternatively be described as a lipophilic (fat/oil loving) segment.

A tackifier is also an example of a suitable carrier. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive commonly used in the adhesives industry, that enhances the ability of a coating to create a bond with an object that the coating is applied upon. For additional background regarding tackifiers and tackifier resins, the *Handbook of Pressure Sensitive Adhesive Technology*, 3$^{rd}$ Edition, (Warwick, R.I.) (1999) is incorporated herein by reference, see pages 36, 37, 57–61, 169, 173, 174, and 609–631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

The terpene base resins include terpene polymers of α-pinene, β-pinene, dipentel, limonene, myrcene, bornylene and camphene, and phenol-modified terpene base resins obtained by modifying these terpene base resins with phenols.

The coumarone base resins include, for example, coumarone-indene resins and phenol-modified coumarone-indene resins.

Petroleum and hydrogenated petroleum resins include aliphatic petroleum resins, alicyclic petroleum resins, aromatic petroleum resins using styrene, α-methylstyrene, vinyltoluene, indene, methylindene, butadiene, isoprene, piperylene and pentylene as raw materials, and homopolymers or copolymers of cyclopentadiene. The petroleum resins are polymers using fractions having a carbon number of 5 to 9 as main components.

The styrene base resins include homopolymers which are low molecular weight polymers comprising styrene as a principal component, and copolymers of styrene with, for example, α-methylstyrene, vinyltoluene, and butadiene rubber.

The phenol base resins include reaction products of phenols such as phenol, cresol, xylenol, resorcinol, p-tert-butylphenol, and p-phenylphenol with aldehydes such as formaldehyde, acetaldehyde and furfural, and rosin-modified phenol resins.

A more preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 parts per hundred, more preferred in the amount between about 0.05 to about 10 parts per hundred. A suitable alternative tackifier is the Escorez series of hydrocarbon tackifiers available from Exxon. For additional information regarding Escorez tackifiers, the specification of U.S. Pat. No. 5,643,665 is hereby incorporated by reference in its entirety. The aforementioned carriers may also be used in combination.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis(trimethoxysilylethyl)benzene. It is also preferred that the poly(alkoxy)silane adhesion promoter is present in the composition in an amount between 0.1 to 10 pph.

Although the adhesion promoter can be any adhesion promoter that includes a compound with a reactive silane, preferably it is an adhesion promoter as described above (i.e., including a compound containing a cyclic structure interposed between at least two reactive silanes, which are independently alkoxysilanes or halosilanes). Other suitable adhesion promoters are described in U.S. Pat. Nos. 4,921,880 and 5,188,864 to Lee et al., the specifications of which are hereby incorporated by reference.

Reference is made to U.S. patent application Ser. No. 09/476,151, filed Dec. 30, 1999, the specification of which is incorporated herein by reference as though fully set forth in its entirety, for a more detailed explanation of the adhesion promoter.

The secondary coating material 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical secondary coatings will include at least one UV curable monomer and at least one photoinitiator. The secondary coating may also include about 0–90 weight percent of at least one UV curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Cognis Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

$$F_1\text{-}R_1\text{-}[\text{Diisocyanate-}R_2\text{-Diisocyanate}]_m\text{-}R_1\text{-}F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes independently —$C_{2-12}$O—, —($C_{2-4}$O)$_n$—, —$C_{2-12}$O—($C_{2-4}$—O)$_n$—, —$C_{2-12}$O—(CO—$C_{2-5}$O)$_n$—, or —$C_{2-12}$O-(CO—$C_{2-5}$NH)$_n$— where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$.

Other polyfunctional oligomers preferably have a structure according to formula (II) or formula (III) as set forth below:

$$\text{multiisocyanate-}(R_2\text{-}R_1\text{-}F_2)_x \qquad (II)$$

or $$\text{polyol-}[(\text{diisocyanate-}R_2\text{-diisocyanate})_m\text{-}R_1\text{-}F_2]_x \qquad (III)$$

where $F_2$ independently represents from 1 to 3 functional groups such as acrylate, methacrylate, acrylamide, N-vinyl amide, styrene, vinyl ether, vinyl ester, or other functional groups known in the art; $R_1$ can include —$C_{2-12}$O, —($C_{2-4}$—O)$_n$—, —$C_{2-12}$O—($C_{2-4}$—O)$_n$—, —$C_{2-12}$O—(CO—$C_{2-5}$O)$_n$l —, or —$C_{2-12}$O—(CO—$C_{2-5}$NH)$_n$— where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference to describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 μm is, e.g., less than 1.0 J/cm$^2$, preferably less than 0.5 J/cm$^2$. It is preferred that the secondary coating composition contains about 10–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in secondary coating materials, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

Reference is made to U.S. patent application Ser. No. 60/173,874, filed Dec. 30, 1999, and Provisional U.S. Patent Application filed Jul. 26, 2000 by Botelho et al., titled Secondary Coating Compositions for Optical Fibers, the specifications of which are incorporated herein by reference as though fully set forth in its entirety, for a more detailed explanation of secondary coatings.

Preferably, secondary coating 18 has a Young's modulus of at least about 50 MPa, more preferably at least about 500 MPa, and most preferably at least about 1000 MPa. In one embodiment of fiber 10, the outer diameter of secondary coating 18 is about 245 $\mu$m.

Secondary coating 18 can be a tight buffer coating or, alternatively, a loose tube coating. Irrespective of the type of secondary coating employed, it is preferred that the outer surface of secondary coating 18 not be tacky so that adjacent convolutions of the optic fiber (i.e., on a process spool) can be unwound.

Ink 20 will include at least one UV curable oligomer present in about 10–90 weight percent, at least one UV curable monomer present in about 10–90 weight percent, at least one photoinitiator present in about 1–15 weight percent, and at least one pigment. The aforementioned oligomers, monomers, and photoinitiators regarding primary coating 16 and secondary coating 18 are suitable oligomers and monomers for ink 20. One preferred composition of ink 20 includes about 35 weight percent of an aliphatic urethane acrylate oligomer (such as RCC 12-892 supplied by Cognis Corp.), about 30 weight percent of an aliphatic epoxy acrylate oligomer (such as RCC 13-215 available from Cognis Corp.), about 15 weight percent of a propoxylated neopentyl glycol diacryalte monomer (such as Photomer 4127 available from Cognis Corp.), about 10 weight precent of an isobornyl acrylate (such as SR-506 available from Sartomer Corp.), about 3 weight percent of a photoinitiator (such as Irgacure 1850 available from Ciba) and a pigment (colored pigments are available from Ciba Colorants and white pigment is available from Millenum Chemicals). Ink 20 may also include up to about 25 weight percent of a dispersant, the weight percent of the dispersant is based on the pigment loading. For example, if ink 20 contains about 10 weight percent pigment, about 25 weight percent dispersant is about 2.5 weight percent of ink 20. Examples of dispersants include Disperbyk 164 from BYK Chemie of Wallingford CT or A-174 Silane (gamma-Methacryloxypropyltrimethoxysilane) from Witco Corp. of Greenwhich Conn. In one embodiment of fiber 10, the outer diameter of ink 20 is about 250 $\mu$m.

The inventive coupling agent may be incorporated into primary coating 16, secondary coating 18, ink 20, or any mixtures thereof. Preferably the inventive coupling agents is included in either secondary coating 18 or ink 20. In the case that the coupling agent is included in ink 20, the coupling agent replaces the dispersant. Use of the inventive coupling agent as a dispersant of ink 20 has the benefit of being a reactive dispersant, whereas traditional polymeric dispersants are not reactive dispersants. In ink 20, the inventive coupling agent will function as at least a reactive dispersant to uniformly disperse the pigment in ink 20. Ink 20 which includes the inventive coupling agent has exhibited excellent dispersion qualities. Agglomerates of the pigment in ink 20 were broken down in at least less than about 2 $\mu$m size and preferably at least less than about 1 $\mu$m.

Another advantage of using the inventive coupling agent as dispersant in ink 20 is that the inventive coupling agents may be used to disperse organic pigments in ink 20 as well as inorganic pigment, such as titanium dioxide. Examples of organic pigments include Irgalite Red 3RS—color index name PR-112 (napthol red pigment) (commercially available from Ciba Speciality Chemicals of Tarrytown, N.Y.), Irgalite Blue GLG—color index name PB 15:3 (copper phthalocyanine pigment) (commercially available from Ciba Speciality Chemicals of Tarrytown, N.Y.), Irgalite Yellow GO—color index name PY 74 (arylamide pigment) (commercially available from Ciba Speciality Chemicals of Tarrytown, N.Y.), Irgalite Orange F2G—color index name PO 34 (diarylide pyrazolone pigment) (commercially available from Ciba Speciality Chemicals of Tarrytown, N.Y.), and Heliogen Green L9361—color index name PG 6 (copper phthalocyanine pigment) (commercially available from BASF, Inc. of Mount Olive, N.J.). The inventive coupling agent is chemically compatible with the both the organic and inorganic pigments. Known coupling agents, such as silane coupling agents, will not undergo a hydrolysis reaction with the surface of an organic pigment.

The inventive coupling agent differs from known dispersants in at least that the inventive coupling agent includes reactive groups that will participate in the polymerization of the coating. In addition to participating in polymerization, the inventive coupling agent has exhibited excellent steric stabilization due to at least the reason that the inventive coupling agent includes a pigment affinic group that attaches itself to the pigment surface and a resin affinic group that extends into the resin thereby providing a physical barrier between pigment particles.

For the reason that the inventive coupling agent is a reactive dispersant it has a further advantage over known dispersants in that any excess inventive coupling agent will polymerize and will not be free to migrate in the coating system once ink 20 has cured like known dispersants.

Ink 20 that includes the inventive coupling agent has also exhibited improved physical properties in comparisons to inks with a known dispersant. The settling rate of the inventive ink is slower, the tensile strength of the ink is higher than an ink with a known dispersant, the Young's modulus and the Secant modulus are all greater than inks with known dispersants. Also inks with zirconate coupling agents have exhibited increased percent elongation.

In the case that the inventive coupling agent is included in secondary coating 18, it is preferred that coating 18 is an unfilled coating or a coating without filler. Filler is defined herein to mean is an inert material of a high specific gravity (2.00–4.50) to provide a certain degree of stiffness and hardness and to decrease the cost of the coating.

Cured secondary coatings 18 which include the inventive coupling agent have exhibited decreased sensitivity to water. The percent change of the coating properties of tensile strength, Young's modulus, and Secant modulus is at least less than about 20%, preferably less than about 15%, more preferably less than about 10%, and most preferably less than about 5% after a prolonged exposure to a wet environment, e.g. 85° C. at 85% relative humidity for at least 14 days.

It is preferred that the coating which includes the inventive coupling agent is not less than about 5 $\mu$m away from an outer surface of cladding layer 14 of fiber 10, more preferably no less than about 15 μm, most preferably no less than about 30 μm. It is also preferred that the coating layer which includes the inventive coupling agent is not applied directly to the fiber. Preferably the coating layer which includes the inventive coupling agent is applied to the fiber after at least one coating not including the inventive coupling agent has been applied to the fiber.

The optical fiber of the present invention can also be formed into a optical fiber ribbon which contains a plurality of substantially aligned, substantially coplanar optic fibers encapsulated by a matrix material. The matrix material can be made of a single layer or of a composite construction. Suitable matrix materials include polyvinyl chloride as well as those materials known to be useful as secondary coating materials. In one embodiment, the matrix material can be the polymerization product of the composition used to form the secondary coating material.

Briefly, the process of manufacturing an optical fiber involves fabricating the glass fiber (core 12 and cladding layer 14), coating the glass fiber with the primary coating composition of the present invention, and polymerizing the composition to form the primary coating material 16. The secondary coating composition is applied to the coated fiber either before or after polymerizing the primary coating. When applied after polymerizing the primary coating, a second polymerization step must be employed. The primary and secondary coating compositions are coated on a glass fiber using conventional processes.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary and optional secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to heat or ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, the specification of which is hereby incorporated by reference. Another method for applying dual layers of coating compositions onto a glass fiber is disclosed in U.S. Pat. No. 4,581,165 to Rannell et al., the specification of which is hereby incorporated by reference. Of course, the primary coating composition can be applied and cured to form the primary coating material 16, then the secondary coating composition(s) can be applied and cured to form the secondary coating material 18.

Figure 2:
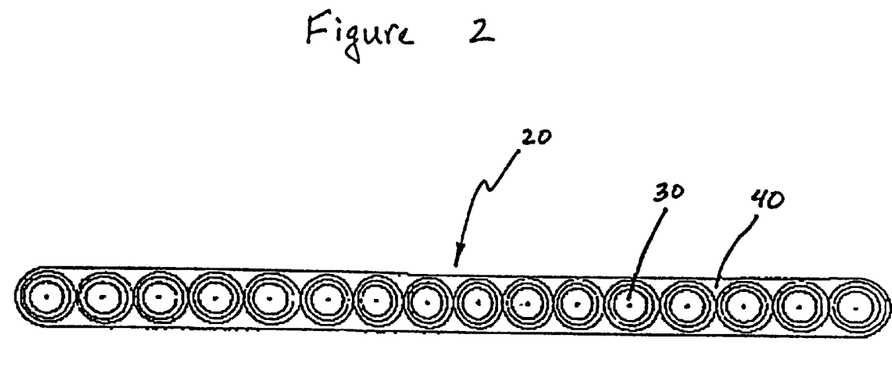
FIG. 2 is a cross sectional view of a fiber optic ribbon.

Coated optical fibers 10 of the present invention can also be used to prepare a fiber optic ribbon 30 using conventional methods of preparation, as shown in FIG. 2. For example, a plurality of coated optical fibers 10 are substantially aligned in a substantially coplanar relationship to one another and, while remaining in this relationship, the coated optical fibers are coated with a composition that is later cured to form the ribbon matrix material 32. The composition used to prepare the ribbon matrix material 32 can be the same as the secondary coating composition, or any other suitable composition known in the art. Methods of preparing optical fiber ribbons are described in U.S. Pat. No. 4,752,112 to Mayr and U.S. Pat. No. 5,486,378 to Oestreich et al., the specifications of which are hereby incorporated by reference.

EXAMPLES

The invention will be further clarified by the following examples which are intended to be exemplary of the invention.

Example 1

The physical properties of a secondary coating which included the inventive coupling agent was studied. The tested secondary coating had the following base composition: about 10 weight percent of the oligomer KWS 4131, about 87 weight precent of the monomer Photomer 4028, about 3 weight percent of the photoinitiator Irgacure 1850, about 0.5 pph of the antioxidant Irganox 1035. Four samples of the secondary coating were prepared. An inventive coupling agent was added to three of the coating samples in an amount of about 0.2 weight percent and one coating sample was used as a control. The three inventive coupling agents tested were KR-55 (titanate coupling agent), NZ-33 (zirconate coupling agent with (meth)acrylate functionality), and NZ-39 (zirconate coupling agent with acrylate functionality).

About a 75 μm cured film sample of each of the 4 coating samples was exposed to a wet environment of about 85° C. at about 85% relative humidity for a period of about 3 weeks in an environmental chamber (commercially available from Tenney Environmental of Williamsport, Pa.). The percent change in tensile strength, Young's modulus and Secant modulus was determined. In testing the strength (i.e. modulus) of the cured materials, the procedures set forth in ASTM D882-97 (which is hereby incorporated by reference) were followed except that a fixed strain rate of about 2.5 cm/minute was employed under environmental conditions of about 23° C. and about 50% relative humidity. The percent change was calculated in accordance with the below formula.

$$\% \text{ change} = 100 * \frac{\text{(Property Before Exposure} - \text{Property After Exposure)}}{\text{Property Before Exposure}}$$

The results of the testing are shown in table 1-1.

TABLE 1-1

| Coupling Agent | % Change Tensile Strength | % Change Young's Modulus | % Change Secant Modulus |
|---|---|---|---|
| Control | −30.5 | −21.0 | −24.0 |
| KR-55 | −5.1 | −7.0 | −3.4 |
| NZ-33 | −9.7 | −5.0 | −13.0 |
| NZ-39 | 0.9 | 5.7 | 5.0 |

The use of the inventive coupling agent was found to improve the physical properties of the secondary coating.

Example 2

The physical properties and the settling rate of an ink which included the inventive coupling agent were also tested. The base composition of the tested ink was about 35 weight percent of RCC 12-892, about 30 weight percent of RCC 13-215, about 15 weight percent of Photomer 4127, about 10 weight percent of SR-506, about 3 weight percent of Irgacure 1850, and about 10 weight percent of pigment. The pigment was a white pigment consisting of $TiO_2$. The coupling agents tested were the same coupling agents tested in example 1. Each coupling agent was added to a sample of the above base composition of the ink in an amount of about 0.2 weight percent. A control ink containing about 5 weight percent based on the $TiO_2$ level of Disperbyk 164 was also prepared. A fifth test sample containing the aforementioned base coating and about 5 weight percent of A-174 Silane based on the $TiO_2$ level was also prepared.

The coupling agents were used as dispersants for the white pigment. A Netzsch small media mill (available from Netzsch Incorporated) and a 0.65 mm zirconia grinding media was used to mill the pigment into a base composition containing about 0.2% by weight of the inventive coupling agent. The control inks were prepared in the same manner except that the inventive coupling agent was replaced by either Disperbyk 164 or A-174 Silane.

A 75 μm cured film sample of each of the 5 test coatings was evaluated to determine the tensile strength, % elongation, Young's modulus, and Secant modulus for each sample as previously stated (ASTM D882-97). The results of the experiment are shown in table 2-1.

TABLE 2-1

| Dispersant | Tensile Strength (MPa) | % Elongation | Young's Modulus (MPa) | Secant Modulus (MPa) |
|---|---|---|---|---|
| Disperbyk 164 (control) | 19 | 15.0 | 800 | 465 |
| KR-55 | 22 | 9.5 | 905 | 530 |
| NZ-33 | 25 | 19.5 | 950 | 590 |
| NZ-39 | 24 | 18.0 | 910 | 580 |
| A-174 Silane | 22 | 8.0 | 1050 | 640 |

The inks which included the inventive coupling agent exhibited increased tensile strength, Young's modulus, and Secant modulus. The coatings which included the zirconate containing inventive coupling agents also exhibited an increase in percent elongation.

The settling rate of the above 5 test samples was also evaluated, however, the sample did not include the photoinitiator. A 10 ml sample of each ink coating, with the respective dispersant, was analyzed in a closed graduated vial. The volume of clear fluid was observed on a weekly basis. The clear fluid represented the coating resin that has separated from the pigment. The results are exhibited in table 2-2 below.

TABLE 2-2

| Dispersant | Week 1 | Week 2 | Week 3 | Week 4 |
|---|---|---|---|---|
| Disperbyk 164 (control) | 4 ml | 6 ml | 6 ml | 7 ml |
| KR-55 | 1.25 ml | 2 ml | 3.5 ml | 6 ml |
| NZ-33 | <0.5 ml | 0.75 ml | 1 ml | 1.5 ml |
| NZ-39 | 0.5 ml | 1 ml | 1 ml | 1.75 ml |
| A-174 Silane | 1.5 ml | 2.75 ml | 4.5 ml | 5.5 ml |

The inks which included the inventive coupling agent exhibited a slower settling rate than the control.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber coating composition comprising:
   a UV curable composition which comprises a coupling agent selected from the group of compounds consisting of titanate coupling agents, zirconate coupling agents, and mixtures thereof, said composition having a Young's modulus of at least about 50 MPa after said composition has been cured.

2. The composition of claim 1 wherein said titanate coupling agent is selected from the group consisting of tetra (2,2 diallyoxymethyl)butyl, di(ditridecyl)phosphito titanate; neopentyl(diallyl)oxy, trineodecanonyl titanate; neopentyl (diallyl)oxy, tri(dodecyl)benzene-sulfonyl titanate; neopentyl(diallyl)oxy, tri(dioctyl)phosphato titanate; neopentyl(diallyl)oxy, tri(dioctyl)pyro-phosphato titanate; neopentyl(diallyl)oxy, tri(N-ethylenediamino)ethyl titanate; neopentyl(diallyl)oxy, tri(m-amino)phenyl titanate; neopentyl(diallyl)oxy, trihydroxy caproyl titanate; and mixtures thereof.

3. The composition according to claim 1 wherein said titanate coupling agent includes at least one UV curable functional group.

4. The composition of claim 1 wherein said coupling agent comprises at least one zirconate coupling agent.

5. The composition of claim 4 wherein said zirconate containing compound is selected from the group consisting of di(ditridecyl)phosphito zirconate; neopentyl(diallyl)oxy, trineodecanoyl zirconate; neopentyl(diallyl)oxy, tri (dodecyl)benzene-sulfonyl zirconate; neopentyl(diallyl)oxy, tri(dioctyl)phosphato zirconate; neopentyl(diallyl)oxy, tri (dioctyl)pyro-phosphato zirconate; neopentyl(diallyl)oxy, tri (m-amino)phenyl zirconate; neopentyl(diallyl)oxy, trimethacryl zirconate; neopentyl(diallyl)oxy, triacryl, zirconate; dineopentyl(diallyl)oxy, di(p-amino benzoyl) zirconate; dineopentyl(diallyl)oxy, di(3-mercapto) propionic zirconate; and mixtures thereof.

6. The composition according to claim 4 wherein said zirconate coupling agent includes at least one UV curable functional group.

7. The composition of claim 1 wherein said UV curable composition further includes a pigment.

8. The composition of claim 7 wherein said UV curable composition is an ink.

9. A coated optical fiber comprising
   a glass fiber; and
   a coating located not less than about 5 microns away from an outer surface of the glass fiber, the coating being the polymerization product of a curable composition, the curable composition including a coupling agent selected from the group of compounds consisting of a titanate coupling agent, a zirconate coupling agent, and mixtures thereof.

10. The coated optical fiber of claim 9 wherein the coupling agent includes a titanate compound selected from the group consisting of tetra (2, 2 diallyoxymethyl)butyl, di(ditridecyl)phosphito titanate; neopentyl(diallyl)oxy, trineodecanonyl titanate; neopentyl(diallyl)oxy, tri(dodecyl) benzene- sulfonyl titanate; neopentyl(diallyl)oxy, tri (dioctyl)phosphato titanate; neopentyl(diallyl)oxy, tri (dioctyl)pyro-phosphato titanate; neopentyl(diallyl)oxy, tri (N-ethylenediamino)ethyl titanate; neopentyl(diallyl)oxy, tri (m-amino)phenyl titanate; neopentyl(diallyl)oxy, trihydroxy caproyl titanate; and mixtures thereof.

11. The coated optical fiber of claim 9 wherein the coupling agent includes a zirconate compound selected from the group consisting of di(ditridecyl)phosphito zirconate; neopentyl(diallyl)oxy, trineodecanoyl zirconate; neopentyl (diallyl)oxy, tri(dodecyl)benzene- sulfonyl zirconate; neopentyl(diallyl)oxy, tri(dioctyl)phosphato zirconate; neopentyl(diallyl)oxy, tri(dioctyl)pyro-phosphato zirconate; neopentyl(diallyl)oxy, tri(m-amino)phenyl zirconate; neopentyl(diallyl)oxy, trimethacryl zirconate; neopentyl (diallyl)oxy, triacryl zirconate; dineopentyl(diallyl)oxy, di(p-amino benzoyl) zirconate; dineopentyl(diallyl)oxy, di(3-mercapto) propionic zirconate; and mixtures thereof.

12. The coated optical fiber of claim 9 wherein the coating is a secondary coating.

13. The coating of claim 9 wherein the coating is an ink.

14. A method of making an optical fiber comprising the step of:

applying non-directly to a surface of the optical fiber a UV curable composition comprising a coupling agent comprising at least one compound selected from the group of compounds consisting of titanate coupling agents, zirconate coupling agents, and mixtures thereof.

15. The method of claim 14 further comprising curing the composition.

16. A coated optical fiber comprising:

a glass fiber; and a cured coating surrounding the glass fiber, the cured coating being the polymerization product of a UV curable composition which comprises a coupling agent devoid of any Si containing compound, the cured coating exhibiting a percent change in tensile strength of no more than about 10% after the cured coating has been exposed to about 85% relative humidity at 85° C. for at least about 14 days.

17. A coated optical fiber comprising:

a glass fiber; and a cured coating surrounding the glass fiber, the cured coating being the polymerization product of a UV curable composition which comprises a coupling agent devoid of any Si containing compound, the cured coating exhibiting a percent change in Young's modulus of no more than about 10% after the cured coating has been exposed to about 85% relative humidity at 85° C. for at least about 14 days.

18. A coated optical fiber comprising:

a glass fiber; and a cured coating surrounding the glass fiber, the cured coating being the polymerization product of a UV curable composition which comprises a coupling agent devoid of any Si containing compound, the cured coating exhibiting a percent change in Secant modulus of no more than about 15% after the cured coating has been exposed to about 85% relative humidity at 85° C. for at least about 14 days.

19. A coated optical fiber comprising:

a glass fiber;

a primary coating surrounding the glass fiber; and an ink layer surrounding the primary coating, the ink layer being the polymerization product of a UV curable composition including a pigment and a coupling agent selected from the group of compounds consisting of titanate coupling agents, zirconate coupling agents, and mixtures thereof.

20. The coated optical fiber of claim 19 further comprising a secondary coating layer between the primary coating and the ink layer.

21. The coated optical fiber of claim 19 wherein the pigment is an organic pigment.

* * * * *